J. THOMSON & F. A. J. FITZ GERALD.
ELECTRIC FURNACE.
APPLICATION FILED MAY 13, 1909.
951,086.
Patented Mar. 1, 1910.
5 SHEETS—SHEET 1.
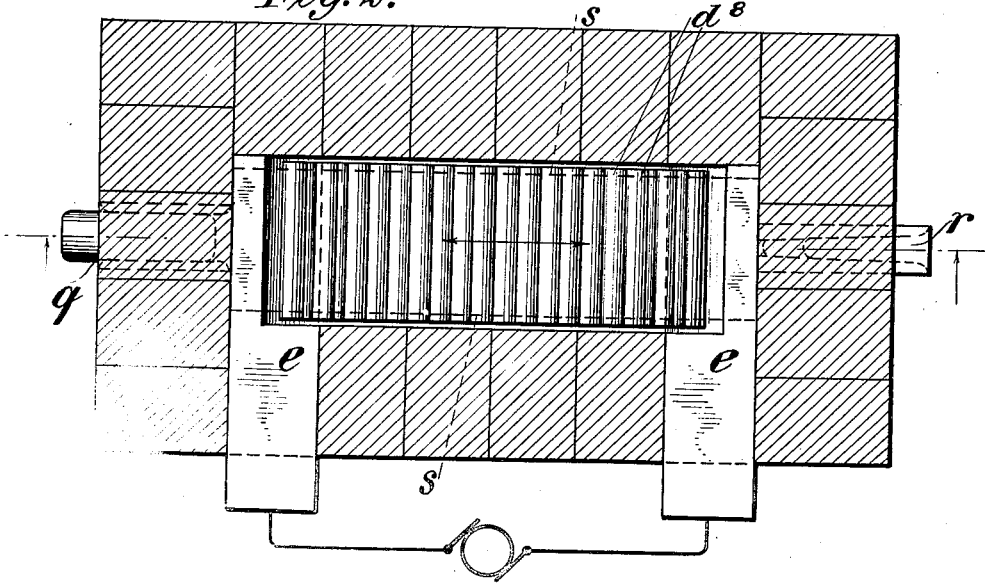
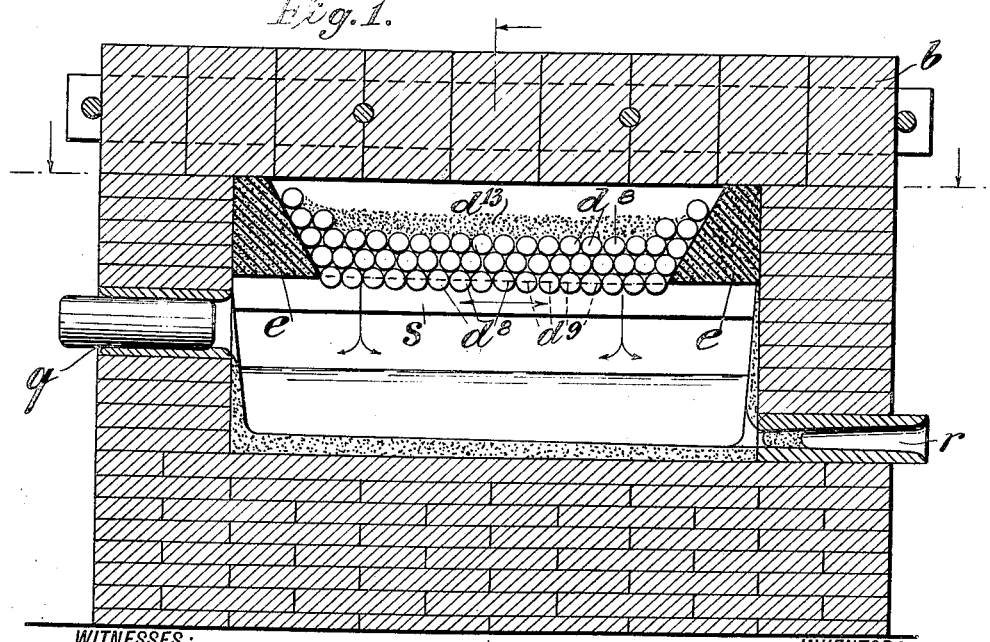

J. THOMSON & F. A. J. FITZ GERALD.
ELECTRIC FURNACE.
APPLICATION FILED MAY 13, 1909.

951,086.

Patented Mar. 1, 1910.
5 SHEETS—SHEET 2.

WITNESSES:

INVENTORS

ATTORNEYS

J. THOMSON & F. A. J. FITZ GERALD.
ELECTRIC FURNACE.
APPLICATION FILED MAY 13, 1909.
951,086.
Patented Mar. 1, 1910.
5 SHEETS—SHEET 3.
Fig. 6.
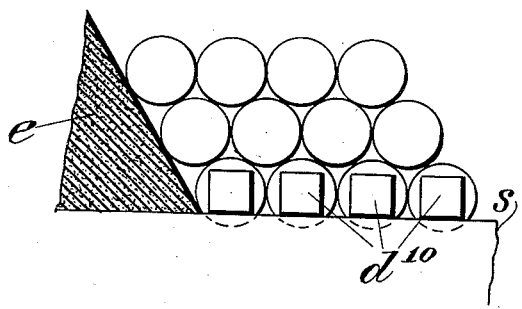
Fig. 7.
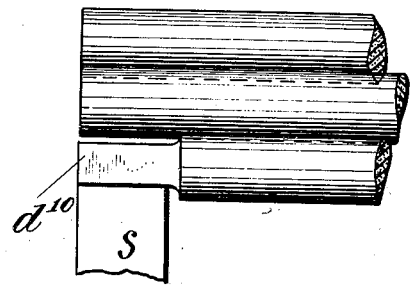
Fig. 8.
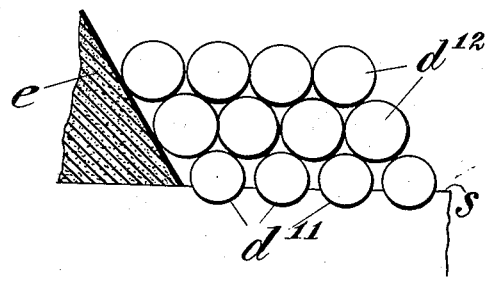
Fig. 9.
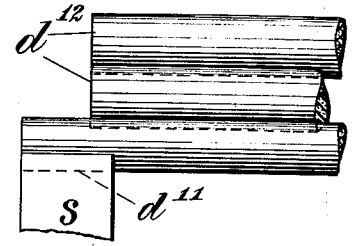
Fig. 10.
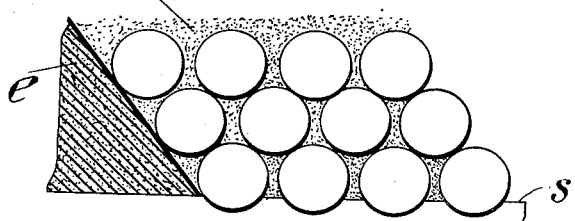
Fig. 11.
Fig. 16.
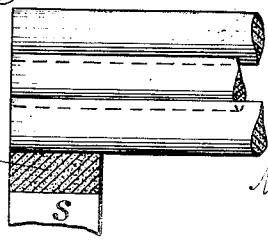
WITNESSES:
W. F. McGuire
Archibald Prehn
INVENTORS
John Thomson and
Francis A. J. Fitz Gerald
BY
Riddle Wendell Varney
ATTORNEYS J. THOMSON & F. A. J. FITZ GERALD.
ELECTRIC FURNACE.
APPLICATION FILED MAY 13, 1909.

951,086.

Patented Mar. 1, 1910.
5 SHEETS—SHEET 4.

WITNESSES:
INVENTORS
John Thomson and Francis A. J. Fitz Gerald
BY
Riddle Wendell Varney
ATTORNEYS J. THOMSON & F. A. J. FITZ GERALD.
ELECTRIC FURNACE.
APPLICATION FILED MAY 13, 1909.

951,086.

Patented Mar. 1, 1910.
5 SHEETS—SHEET 5.

WITNESSES:

INVENTORS

John Thomson and Francis A. J. Fitz Gerald
BY
Siddle Wendell & Varney
ATTORNEYS

UNITED STATES PATENT OFFICE.

JOHN THOMSON, OF NEW YORK, AND FRANCIS A. J. FITZ GERALD, OF NIAGARA FALLS, NEW YORK, ASSIGNORS TO IMBERT PROCESS COMPANY, OF NEW YORK, N. Y., A CORPORATION OF NEW YORK.

ELECTRIC FURNACE.

951,086.  Specification of Letters Patent.  Patented Mar. 1, 1910.

Application filed May 13, 1909. Serial No. 495,584.

*To all whom it may concern:*

Be it known that we, JOHN THOMSON, a citizen of the United States, and a resident of the borough of Manhattan of the city of New York, in the county and State of New York, and FRANCIS A. J. FITZ GERALD, a subject of the King of Great Britain, and a resident of Niagara Falls, in the county of Niagara of said State of New York, have invented certain new and useful Improvements in Electric Furnaces, of which the following is a specification, reference being had to the accompanying drawings, forming a part hereof.

In another application of one of the present applicants filed May 13, 1909, Serial Number 495,577, a complete electric furnace has been shown and described in which there is embodied a carbon resister adapted to maintain a practically uniform intensity of pressure or contact within and between the several elements thereof for the purpose of producing a substantially uniform contact resistivity. In that application several forms which the resister might assume are illustrated and treated of; in the present application, however, another form or embodiment of said resister is provided in which use may be made of round carbon rods which are so comparatively easy and inexpensive to produce and which offer particular advantages in carrying out the improvements alluded to in the other application.

Figure 3:
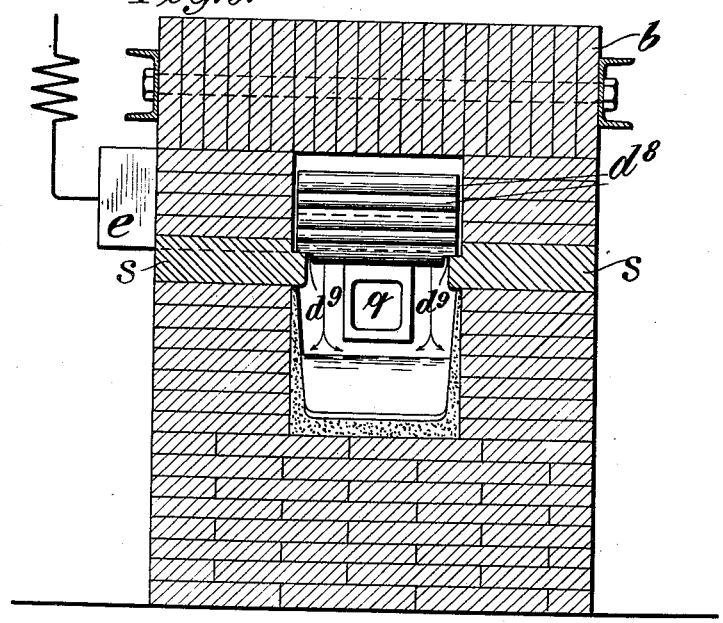
Figure 4:
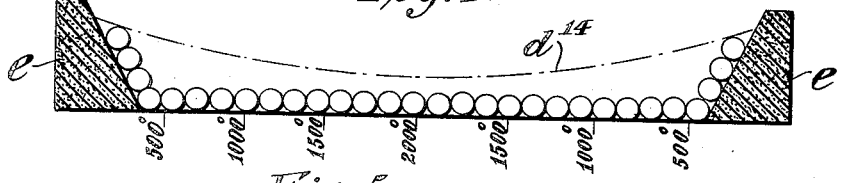
Figure 5:
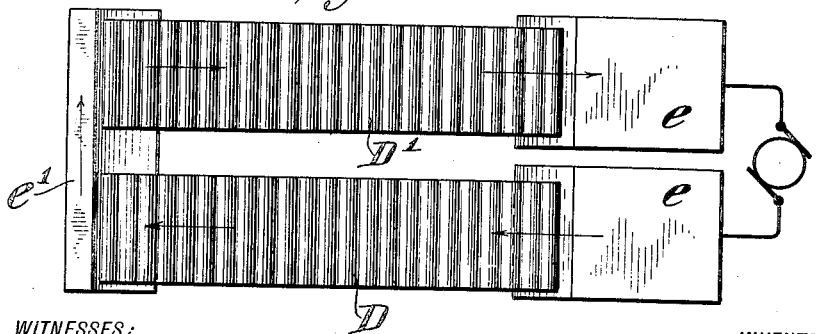
Figure 12:
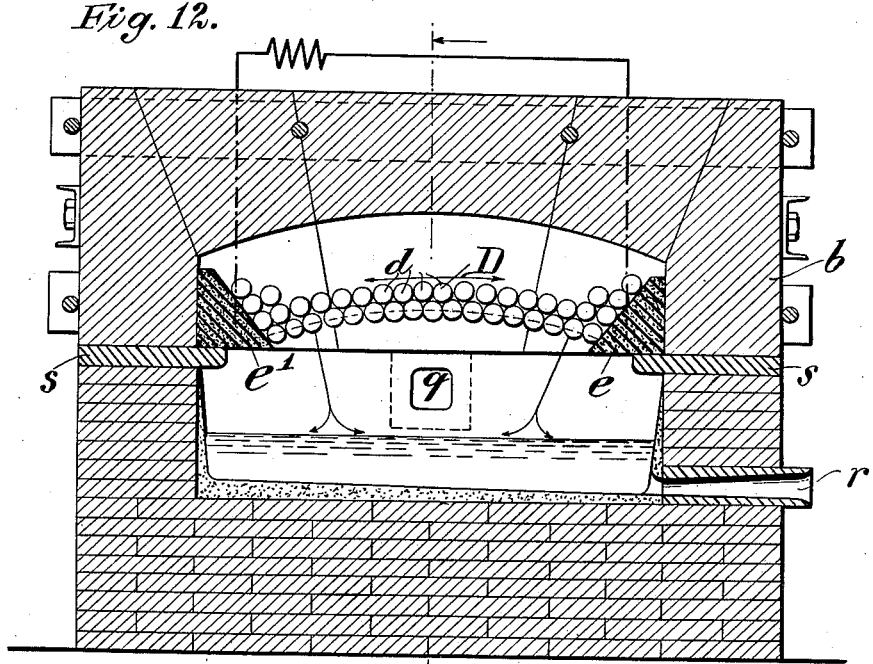
Figure 13:
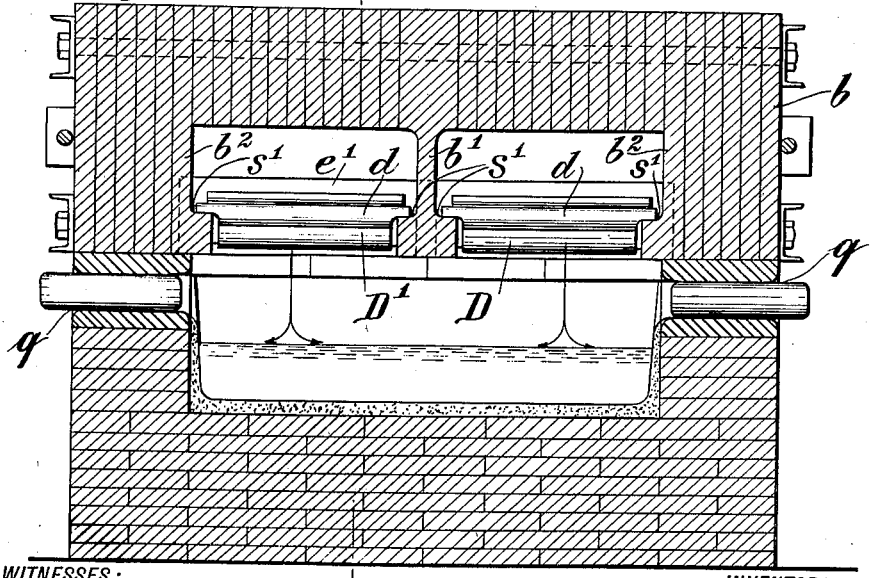
Figure 14:
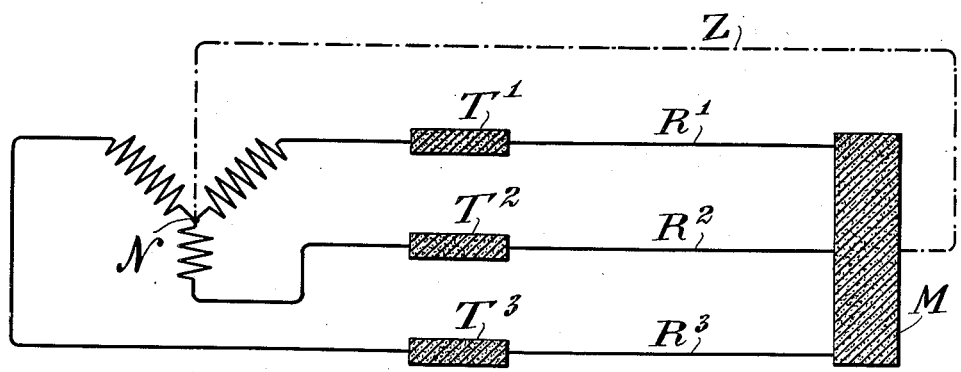
Figure 15:
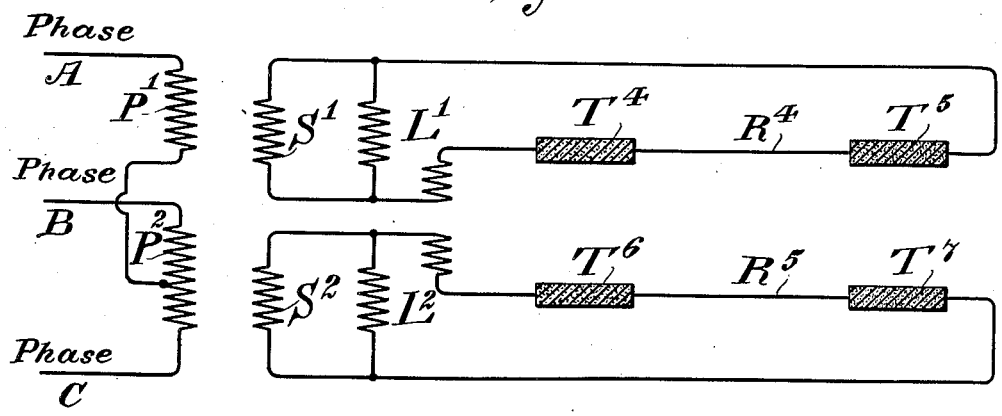

The main object of this invention accordingly has been to devise a resister of round carbon rods, which shall have the requisite qualities of adaptability and flexibility, and also to overcome certain difficulties or objections which the use of such rods for this purpose had developed. These difficulties or objections will be more particularly set forth hereinafter and in connection with the accompanying drawings, in which, Figure 1 is a view in longitudinal vertical section of a furnace embodying the invention. Fig. 2 is a top plan view with the cover removed. Fig. 3 is a view in central transverse section. Fig. 4 denotes, diagrammatically, a method of construction for producing variable temperatures. Fig. 5 shows the resister compounded and in plan, adapted to be operated in direct circuit. Figs. 6 and 7, 8 and 9, 10, 11 and 16 respectively, show detail end and side views of the resister-rods and their supports. Fig. 12 is a view in vertical section indicating a modification in the form and mounting of the resister. Fig. 13 is a view in vertical central section showing a compound resister in direct circuit, and, Figs. 14 and 15 are diagrams showing circuit connections which may be used for poly-phase currents.

From Fig. 1, it will be seen that the round carbon rods $d^s$ are stacked or piled in staggered horizontal rows, abutting right and left against carbon terminals $e$ where, as in the case of the furnace shown in Fig. 1, a single series resister is employed. These carbon terminals are preferably beveled so that the end rods of the resister will rest naturally against them and have a gravitating contact therewith while exerting an inward thrust upon contiguous rods, and particularly so if a greater depth of rods are stacked upon the terminals. The angle at which the terminals should be beveled for this purpose will generally be about 30°. As thus constituted the resister may be supported above the hearth of the furnace chamber by rows of refractory bricks $s$ projecting inwardly, the ends of the lower layer or row of rods resting upon said bricks. It will be clear that with this arrangement of the rods, the electrical conductivity or resistance will be a function of the number of contacts the sum of which is governable by the diameters of the rods, their depth, the manner in which they are spaced and the length of the resister between its terminals. But whatever the resistivity may be, when the rods are arranged in the general manner so far described, the entire body of the resister may be said to be articulated; hence it will universally and automatically respond throughout its mass to such variations caused by expansion or contraction as take place in such material when highly heated. The consequence is that the contact conductivity of the resister will not be sensibly affected by physical compression or extension, as if its integral parts were rigidly confined; therefore, not only is the difficulty of regulating the flow of energy by extraneous control minimized, but it becomes feasible to maintain a practically constant "load" therein which is the ideal mode of operation. Moreover, should several of the rods frit away and crumble others will roll into place thereby prolonging the life of the resister as a whole.

It has been found in practice that a resister formed of a plurality of rods of equal length and diameter arranged in uniform impingement will develop the highest temperature at the contacts between the lower layer or row of rods and the refractories upon which they rest. In fact it has been demonstrated that the supporting refractories are the parts most likely to have the least endurance under such conditions. The cause of this phenomenon is the weight of the resister as a whole being sustained upon the relatively short lines which rest upon the refractories, such lines constituting a contact without any sensible area. Moreover the heat generated by the current at the contact of the rods where they rest on the refractories cannot radiate so rapidly as at other parts of the resister and consequently those parts of the rods are raised to an excessive temperature, which results in the destruction of the refractories. This difficulty may be completely obviated by increasing the area of contact between the carbon rods and the refractories on which they rest, thus diminishing the pressure per unit of contact surface and relieving the strain on the highly heated refractories. It is advantageous to insulate the ends of the rods from each other where they rest on the refractories so that no current will flow through these parts of the rods, and hence no heat will be generated there. In this way the endurance of the supporting refractories may be made quite equal to that of any other portion of the furnace and at the same time the electric efficiency of the apparatus may be increased. This relief of the tension upon the resister rods and the refractory supports can be carried into practical effect in various ways. Thus, in Figs. 1 and 3, it will be observed that the ends of the lower series of rods are semicircular in cross section, their flat surfaces $d^9$ resting upon the supports $s$. In Figs. 6 and 7, the ends of the lower rods are squared $d^{10}$, this affording the required area and also insulating each from the other. In Figs. 8 and 9, the refractory is provided with circular recesses $d^{11}$ in which the ends of the lower layer or row of rods rest. This lower layer may be, as shown, of smaller diameter than the upper, and again the upper rods $d^{12}$ may be shortened so as not to fully extend over the seats. As shown in Figs. 10 and 11, the same disposal is made as in Figs. 8 and 9, except that the spacing of the circular recesses and the diameters of the rods are such that the horizontal side-contacts are separated, thereby decreasing the number of contacts and increasing the resistivity. The interstices thus produced may be filled with granular carbon, again effectively modifying the resistance, and the entire upper portion of the resister may be covered with a layer of granular carbon $d^{13}$ (Figs. 1, 10). In this wise, the resistance being greater at the top, there will be greater current density at the bottom; hence the upper surface will be the cooler and the more rapid delivery of heat will be from the lower surface directly to the bath, as indicated by the arrows.

When there is a very high resister temperature, the carbon rods, where they rest upon the supports, may cause fusion of the latter. To obviate this there may be placed between the ends of the resister rods and the refractory supports small carbon blocks $d^{18}$. These blocks are insulated electrically from each other and are preferably made of charcoal, because that substance is a relatively poor conductor of heat and electricity. These charcoal blocks may be made by agglomerating charcoal with pitch or tar, or they may be cut from blocks of the original charcoal. The charcoal before use is preferably graphitized as that greatly increases its temperature of combustion.

As it is desirable in certain operations to have a progressively increasing or diminishing temperature through the furnace chamber, this can readily be obtained by stacking the rods to produce a variable thickness in such manner, say, as is shown in Fig. 4, the upper contour of the resister following the curve $d^{14}$. The consequence of this construction is that the temperature will progressively increase from each end toward the center, as is illustratively noted in this figure.

The employment of round carbon rods for the construction of the resister is especially advantageous from the commercial point of view in that, as they are capable of being produced by extrusion, they are the least expensive form to manufacture and their accuracy, as to straightness and uniformity in diameter, are quite sufficient for the purpose. Then, too, by simply lifting off the cover $b$ they can be quickly removed and substituted with either cold or partially preheated rods, whereby but little heat is lost from the furnace chamber.

A compound resister formed of round rods is shown in Fig. 5, D, D' having a common graphite connector $e'$ and carbon terminals $e$ the current passing as indicated by the arrows. No amplification of this feature will be here given as it is fully described in another application filed concurrently herewith by one of the present applicants; but it may be mentioned that in this wise very high resistivity may be obtained with the utmost compactness of structure in the furnace as a whole. This illustration is introduced to make more clear a mode of utilizing a compound carbon rod resister in the modification shown in Figs. 12 and 13. In this latter instance, each half of the resister D is superimposed in the arc of a circle, abutting right and left against the respective terminals e on one side, and the connector e' on the other. The said terminals and connector are partially supported by refractories, projecting inwardly from the side walls of the furnace; but all are preferably built into the cover b the terminals projecting through to the outside to be connected in electric circuit. For instance, the cover may be built up from wedge blocks as shown, the center blocks b' and the two inner series of side-blocks b² having curved flanges s' upon which the resister rods d rest. In this wise the tendency of the rods is to thrust by gravity right and left against the connector and the terminals. The linear length of the resister is somewhat increased, due to its curvature, and the entire structure, cover, resister, and all its connections may be removed integrally exposing the furnace chamber.

It will be clear that suitable charging openings q may be provided as well as a tap spout r.

In consequence of the adaptable-flexibility, so to speak, of the resister, the readiness with which it may be constructed for operation by the available voltage, and the fact that when once brought to the desired temperature it can be maintained for a considerable period of time at that temperature with comparatively slight changes of voltage and amperage, the furnace as a whole lends itself well to poly-phase currents. Thus, in the case of a 3-phase current the "star connection" may be used, as shown in the diagram of Fig. 14. In this instance, T, T², T³ are the terminals of the three parallel resisters R', R², R³; which are in contact with the common connector carbon M. Should there be a sufficient difference in the resistivity of the several resisters to cause unbalancing the neutral point, N, can be connected to the connector, M, as denoted by the broken line Z; but with careful construction this may be dispensed with. So, too, in the case of current being supplied by a 3-phase transmission line, the very satisfactory arrangement may be used which is shown in the diagram of Fig. 15. Here, the 3-phase current is brought to the primaries P', P², of two transformers provided with the Scott connection. Two single phase currents are then obtained from the secondaries S', S², of the transformers and go to the two parallel resisters R⁴, R⁵, between their respective terminals, T⁴, T⁵, T⁶ and T⁷. An induction regulator L', L² is in each circuit, whereby the voltage at the terminals of the resisters may be regulated.

We claim as our invention:

1. In an electric furnace, a resister composed of separable staggered rods, each rod being in lineal contact with one or more of the other rods and the electric current being adapted to pass through the rods in direct series.

2. In an electric furnace, a resister composed of staggered round rods, each rod being in lineal contact with one or more of the other rods and the electric current being adapted to pass through the rods in direct series.

3. An electric furnace having a plurality of carbon rods loosely stacked upon each other to constitute the resister.

4. An electric furnace having beveled terminals and a plurality of rods stacked between the terminals constituting the resister.

5. An electric furnace having two terminals beveled to about 30° and a plurality of rods in staggered relation between the two terminals.

6. An electric furnace having two beveled terminals and a beveled connecting piece, and a stack of rods between each terminal and the connecting piece constituting a compound resister.

7. An electric furnace having a resister directly over the furnace chamber, the said resister comprising a stack of carbon rods in staggered relation.

8. An electric furnace provided with a cover directly over the furnace chamber and having a plurality of round carbon rods embodied therein to constitute the resister.

9. In an electric furnace, the combination of a cover directly over the furnace chamber, a pair of terminals in the cover, a connecting piece in the cover, and a stack of resister rods between each terminal and the connecting piece supported by the cover.

10. In an electric furnace, the combination of a resister and means covering the side thereof which is not presented to the furnace chamber to decrease the current density on that side.

11. In an electric furnace, the combination of a resister directly above the furnace chamber, and means covering the top thereof to decrease the current density at the top.

12. In an electric furnace, the combination of a carbon resister directly above the furnace chamber and separated by a space from the top of the furnace, and a layer of granular carbon covering the top of the resister so that the upper side of the resister shall present to said space a relatively cooler face than the lower side presents to said chamber.

13. An electric furnace having a resister composed of a stack of rods, said stack having a variable thickness.

14. An electric furnace having a resister composed of a stack of rods extending over the furnace chamber from right to left and progressively decreasing in thickness from the ends to the center.

15. In an electric furnace, the combination of a resister composed of a stack of rods of which the lower ones act as supporting members for the stack, and a support for the same, the area of contact between said support and said supporting members of the rods being relatively large.

16. In an electric furnace, the combination of a resister composed of a stack of rods of which the lower ones act as supporting members for the stack, a support for the same, and means to increase the area of contact between said support and said supporting members of the rods.

17. In an electric furnace, the combination of refractory supports, a resister composed of a stack of rods of which the lower ones act as supporting members and are provided with means to increase the area of contact between said rods and said support.

18. In an electric furnace, the combination of a resister composed of a stack of rods, supports for the ends of the lower layer of rods, means to pass current across the rods which are in series relation and means to increase the area of contact between said ends and said supports.

19. An electric furnace having a resister composed of a stack of rods, means to pass the current through the rods in series, and non-conducting supports for the rods, the lower series of rods acting to sustain the upper ones and being flattened where they rest upon the said support for the purpose of reducing the pressure per unit area upon the supports.

20. An electric furnace having a resister composed of a stack of round rods, means to pass the current through the rods in series, and non-conducting refractory supports for the rods, the ends of the lower series of rods acting to sustain the upper ones and their ends being insulated from one another for the purpose of preventing current passing through the parts of the rods which rest on the refractory supports.

21. In an electric furnace, the combination of refractory supports having recesses, and a resister composed of a plurality of rods stacked upon each other and the ends of the lower layer of which fit into said recesses.

22. In an electric furnace the combination of refractory supports, and a resister composed of a plurality of rods stacked upon each other, the rods in the lower layer being longer than the other rods so as to project over and rest upon said supports.

23. In an electric furnace, the combination of refractory supports, and a resister composed of a plurality of rods stacked upon each other, the rods in the lower or supporting layer being spaced apart so as to avoid contact and reduce the current flowing along the supports.

24. In an electric furnace, the combination of refractory supports having circular recesses, and a resister composed of a plurality of round rods of which the ends of the rods in the lower layer rest in said circular recesses, said rods in the lower layer being of a less diameter than the others so as not to contact and of a greater length so as to project over and rest upon said supports.

This specification signed and witnessed this 11th day of May, A. D., 1909.

JOHN THOMSON.
FRANCIS A. J. FITZ GERALD.

Signed in the presence of—
G. McGRANN,
FRANCIS E. VARNEY.